March 27, 1934.  W. C. UDE  1,952,341
VIBRATORY ELECTRIC MOTOR
Filed Dec. 24, 1931  2 Sheets-Sheet 1
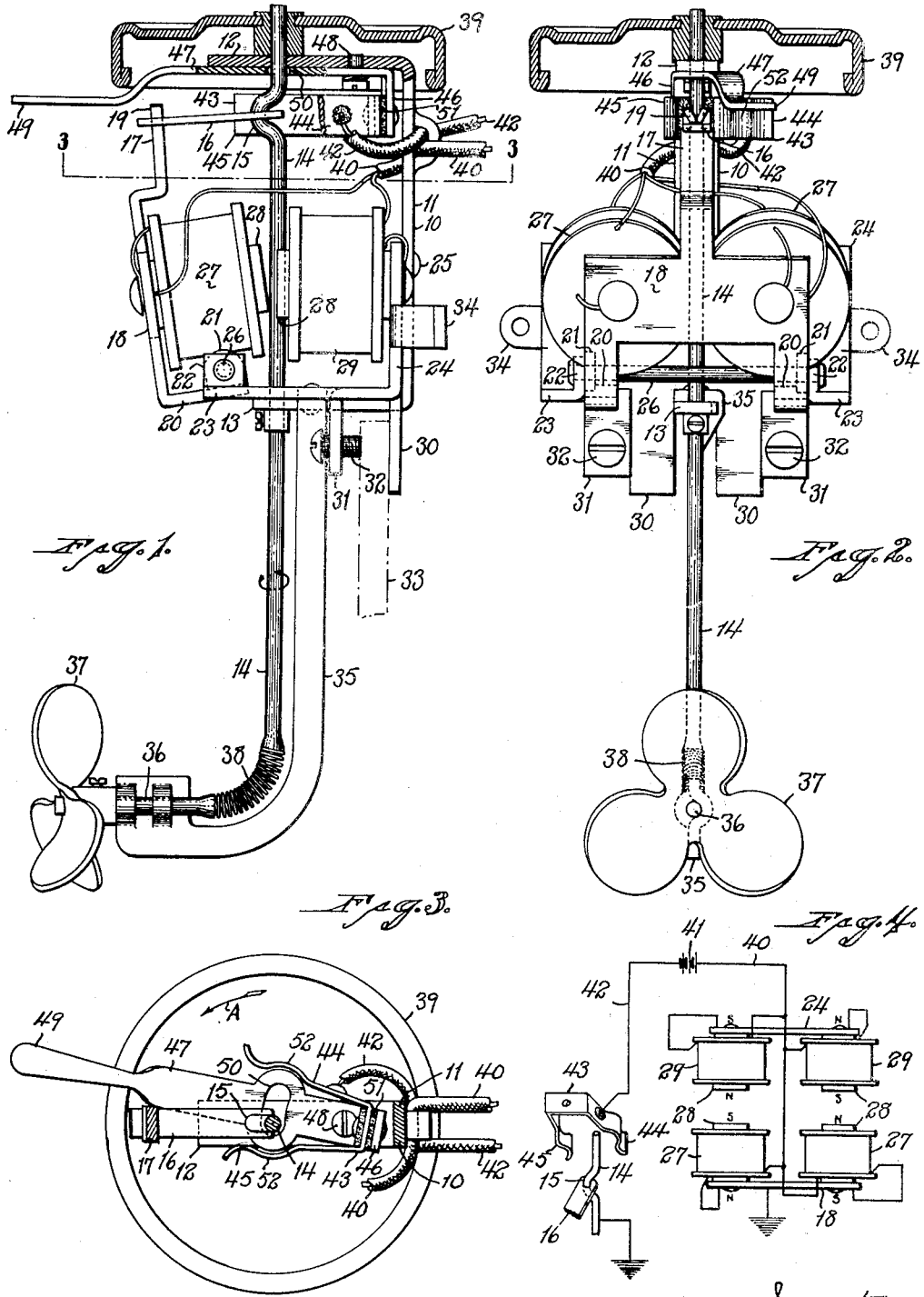

March 27, 1934. W. C. UDE 1,952,341
VIBRATORY ELECTRIC MOTOR
Filed Dec. 24, 1931 2 Sheets-Sheet 2
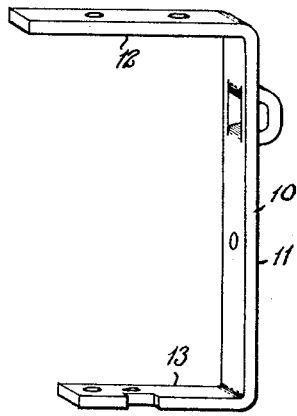
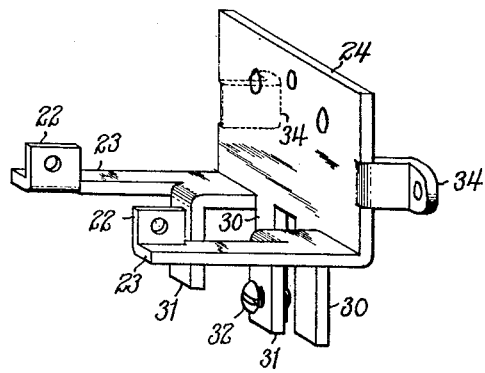
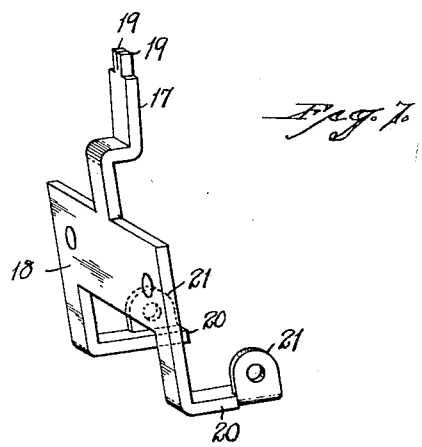
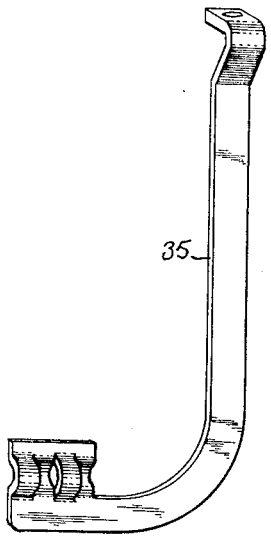
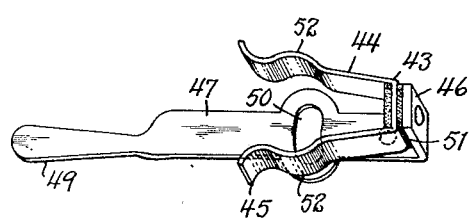
Inventor
William C. Ude
Seymour Earle & Nichols
attys Patented Mar. 27, 1934

1,952,341

UNITED STATES PATENT OFFICE 1,952,341

VIBRATORY ELECTRIC MOTOR

William C. Ude, East Haven, Conn.

Application December 24, 1931, Serial No. 582,925

10 Claims. (Cl. 172—126)

This invention relates to improvements in vibratory electric motors and particularly to vibratory electric motors intended for use as toys, though not so limited.

The main object of my present invention is to produce, at a low cost for manufacture, a durable and reliable vibratory electric motor constructed with particular reference to economy of current consumption and high power output.

With the above and other objects in view as will appear from the following, my invention consists in a vibratory electric motor having certain features of construction and combinations of arrangements of parts as will be hereinafter described and particularly recited in the claims.

In the accompanying drawings:

Fig. 1 is a view partly in side elevation and partly in longitudinal section of a vibratory electric motor constructed in accordance with my invention and shown as incorporated in a so-called "outboard" motor for the propulsion of toy boats;

Fig. 2 is a view thereof mainly in rear elevation and partly in vertical section;

Fig. 3 is a transverse sectional view taken on the line 3—3 of Fig. 1;

Fig. 4 is a diagrammatic view showing the electrical connections;

Fig. 5 is a detached perspective view of the motor-frame;

Fig. 6 is a similar view of the stationary magnet-frame;

Fig. 7 is a similar view of the oscillating magnet-frame;

Fig. 8 is a similar view of the propeller-supporting bracket; and

Fig. 9 is a similar view of the control-lever and brush-unit assembly.

The particular vibratory electric motor herein chosen for the illustration of my invention consists of a U-shaped frame generally designated by the numeral 10 and consisting of a vertical reach 11 and complementary upper and lower horizontal reaches or arms 12 and 13 respectively. Bearing in both of the reaches 12 and 13 of the frame 10 is a vertical crank-shaft 14 offset near its upper end at a point immediately below the reach 12 to form a crank 15 which is encircled by the inner end of a bar-like connecting-rod 16, the outer end of which latter is pivotally connected to the upstanding shank 17 of an oscillating magnet-frame 18 having the upper end of its shank 17 split and expanded to form retaining-prongs 19—19, serving to prevent the connecting-rod 16 from being displaced.

The oscillating magnet-frame 18 is of plate-like form and is preferably made of iron or other suitable magnetic material, and is provided at its lower end with a pair of inwardly-projecting arms 20—20, each having an upstanding perforated ear 21. The respective upstanding ears 21 of the arms 20—20 are spaced from each other sufficiently to freely fit between upstanding perforated ears 22—22, one of which is formed upon each of a pair of complementary arms 23—23, forwardly offset from the lower end of a plate-like stationary magnet-frame 24, which latter is preferably formed of magnetic material and is secured in any approved manner, such as by a rivet 25, to the vertical reach 11 of the frame 10 before referred to. A transverse pin 26 extends through the respective ears 21—21 and 22—22 and serves to mount the magnet-frame 18 for pivotal movement.

Rigidly secured to the oscillating magnet-frame 18 is a pair of corresponding electromagnets 27—27 arranged horizontally in line and each having the usual core-piece 28 of iron or other suitable magnetic material and riveted or otherwise secured to the said magnet-frame 18.

The electromagnets 27—27 just above referred to are arranged in line with a corresponding pair of stationary electromagnets 29—29, each also having the usual core-piece 28 riveted or otherwise secured to the stationary magnet-frame 24 before referred to, and magnetically interconnected by the same. The magnet-frames 18 and 24 also jointly serve to magnetically interconnect the outer ends of the core-pieces 28 of the electromagnets 27—27 with the outer ends of the core-pieces 28 of the electromagnets 29—29 to increase the pull between the respective inner ends of the said core-pieces.

The stationary magnet-frame 24 is also formed with a pair of depending clamping-fingers 30—30 while the forwardly-extending arms 23—23 before referred to are formed with complementary clamping-fingers 31—31 spaced forwardly of the fingers 30—30 and each preferably provided with a clamping-screw 32 by means of which the motor-structure may be secured to the stern-board 33 (indicated by broken lines in Fig. 1) of a toy motor boat which is adapted to fit between the respective pairs of fingers 30—30 and 31—31. The respective opposite side edges of the stationary magnet-frame 24 are also provided with rearwardly-offsetting perforated ears 34—34, providing an alternative mode of securing the motor-structure in place.

My improved motor is adapted for many uses, but as herein shown, it is constructed and arranged in conjunction with a so-called "outboard motor" unit, which consists, in addition to the parts already described, in a depending and forwardly-curved propeller-supporting bracket 35, supporting a short horizontal propeller-shaft 36 which latter carries at its outer end a propeller 37, and is connected at its inner end by means of a helical spring 38 to the lower end of the crank-shaft 14, before referred to. The helical spring serves as a universal joint in transmitting driving force from the crank-shaft 14 to the propeller-shaft 36. The end of the crank-shaft 14 projects upwardly through the horizontal reach 12 of the frame 10 and is there provided with a fly-wheel 39.

The four electromagnets 27—27 and 29—29 may be simultaneously energized in any approved manner, but as herein shown, one lead of each of the said magnets is grounded and the remaining lead of each magnet is connected to a wire 40 leading to a battery 41 or other suitable source of electrical energy. The opposite terminal of the battery 41 is connected by a wire 42 to a U-shaped brush, generally designated by the numeral 43 and having a pair of complementary slightly-diverging resilient arms 44 and 45. The said brush 43 is secured to a vertical arm 46 of a horizontal oscillating control-lever 47 pivotally mounted by means of a stud 48 to the under-face of the horizontal reach 12 of the frame 10, and having its handle-portion 49 extending outwardly beyond the periphery of the fly-wheel 39.

The control-lever 47 above referred to is formed with an arcuate slot 50 to clear the upper end of the crank-shaft 14, and is adapted to be swung from side to side to alternately bring one or the other of the resilient arms 44 or 45 of the brush 43 into position to be engaged by the inner end of the connecting-rod 16, as will hereinafter appear. The brush 43 is insulated from the motor-structure by interposing a suitable body of insulation 51 between the same and the vertical arm 46 of the control-lever 47.

To avoid the necessity of unduly flexing the arms 44 and 45 of the brush 43 when the inner end of the connecting-rod 16 is engaged with either one of the same as it is swung around by the crank 15, each of the said resilient arms is formed with an outwardly-bowed portion 52 which more or less conforms to the arc through which the inner end of the said connecting-rod sweeps.

Let it be presumed that the control-lever has been swung so as to bring the arm 45 of the brush 43 in position to be wiped by the inner end of the connecting-rod 16. This movement will, incidentally, also serve to move the complementary arm 44 out of the path of the said connecting-rod.

If the fly-wheel 39 be now given an initial manual impulse in the direction of the arrow A in Fig. 3, each time the inner end of the connecting-rod makes engagement with the arm 45 of the brush 43, the four electromagnets will be simultaneously energized with the result that the pair of oscillating magnets 27—27 will be swung inward about the pin 26, as a center, to impart an impulse to the crank-shaft 14 and associated parts. Thus, at each revolution of the crank-shaft 14, the same will receive an impulse and the momentum of the fly-wheel will serve to keep the motor in operation until the current-supply is cut off.

If it is desired to have the motor operate in a reverse direction from that just above described, this may be accomplished by swinging the control-lever 47 so as to bring the arm 44 of the brush 43 in position to be engaged by the inner end of the connecting-rod 16 and at the same time retire the arm 45 out of the path thereof.

By employing one or more movable electromagnets, mounted for movement relative to one or more complementary magnets, rather than relying upon a passive armature as has been the general custom heretofore, I am enabled in a small structure to produce a high-power output, together with a relatively-low current consumption.

It will be understood by those skilled in the art that my invention may assume varied physical forms without departing from my inventive concept and I, therefore, do not limit myself to the specific embodiment herein chosen for illustration, but only as indicated in the appended claims.

I claim:

1. In a vibratory electric motor, the combination with a pair of complementary electromagnets of approximately the same electromagnetic strength positioned with respect to each other so as to mutually interact, one of the said magnets being mounted for vibratory movement toward and away from the other; a rotary-driven member; means connecting the said movable magnet with the said rotary-driven member for converting the vibratory movement of the former into a rotary movement of the latter; and automatic means for simultaneously supplying electric current to both of said magnets.

2. In a vibratory electric motor, the combination with a pair of complementary electromagnets of approximately the same electromagnetic strength positioned with respect to each other so as to mutually interact, one of the said magnets being mounted for vibratory movement toward and away from the other; a rotary-driven member; means connecting the said movable magnet with the said rotary-driven member for converting the vibratory movement of the former into a rotary movement of the latter; and automatic means for simultaneously supplying electric current to both of said magnets, including a member having a wiping-portion traveling in a substantially-circular path and a yielding brush having a portion curved to substantially conform to the path of travel of the said wiping-portion.

3. In a vibratory electric motor, the combination with a pair of complementary electromagnets positioned with respect to each other so as to mutually interact, one of the said magnets being mounted for vibratory movement toward and away from the other; means composed of magnetic material for guiding the said movable electromagnet and serving to magnetically interconnect one pole thereof with one pole of the other electromagnet; a rotary-driven member; means connecting the said movable magnet with the said rotary-driven member for converting the vibratory movement of the former into a rotary movement of the latter; and automatic means for simultaneously supplying electric current to both of said magnets.

4. In a vibratory electric motor, the combination with a stationary electromagnet; an oscillating electromagnet located adjacent the said stationary electromagnet in position to mutually interact therewith; a frame of magnetic material for supporting the said stationary electromagnet; a movable frame of magnetic material for supporting the said oscillating electromagnet and pivotally connected to the said frame of the stationary electromagnet; a rotary-driven member and means connecting the said oscillating magnet with the said rotary-driven member for converting the oscillating movement of the former into a rotary movement of the latter; and automatic means for simultaneously supplying electric current to both of said magnets.

5. In a vibratory electric motor, the combination with a pair of stationary electromagnets; a pair of movable electromagnets located adjacent the said stationary electromagnets in position to vibrate toward and away from the same and to mutually interact therewith; a stationary frame of magnetic material for supporting the said stationary magnets and for magnetically interconnecting the same; a movable frame of magnetic material for supporting the said movable magnets and magnetically connected to the said stationary frame and serving to magnetically interconnect the said movable electromagnets to each other and to the said stationary electromagnets; a rotary-driven member; means connecting the said movable magnets with the said rotary-driven member for converting the vibratory movement of the former into a rotary movement of the latter; and automatic means for simultaneously supplying electric current to both of said pairs of magnets.

6. In a vibratory electric motor, the combination with a pair of stationary electromagnets; a pair of movable electromagnets located adjacent the said stationary electromagnets in position to vibrate toward and away from the same and to mutually interact therewith, all of said electromagnets being of approximately the same electromagnetic strength; a rotary driven member; means connecting the said movable magnets with the said rotary driven member for converting the vibratory movement of the former into a rotary movement of the latter; and automatic means for simultaneously supplying electric current to both of said pairs of magnets.

7. In a vibratory electric motor, a frame having spaced arms; a shaft mounted to rotate in said arms and having a crank; an oscillatory member pivoted to said frame; a connecting rod interconnecting said oscillatory member and said crank adapted to convert the oscillatory motion of said member into rotary motion of said shaft; electromagnetic means connecting said frame and said oscillatory member and adapted to oscillate said member; and automatic means for supplying electric current to said electromagnetic means.

8. In a vibratory electric motor, a frame having spaced arms; a shaft mounted to rotate in said arms and having a crank; an oscillatory member pivoted to said frame; a connecting rod interconnecting said oscillatory member and said crank adapted to convert the oscillatory motion of said member into rotary motion of said shaft; electromagnetic means connecting said frame and said oscillatory member and adapted to oscillate said member; automatic means for supplying electric current to said electromagnetic means; and opposed, spaced clamping fingers extending from adjacent one of said arms.

9. In a vibratory electric motor, a frame having spaced arms; a shaft mounted to rotate in said arms and having a crank; an oscillatory member pivoted to said frame; a connecting rod interconnecting said oscillatory member and said crank adapted to convert the oscillatory motion of said member into rotary motion of said shaft; electromagnetic means connecting said frame and said oscillatory member and adapted to oscillate said member; automatic means for supplying electric current to said electromagnetic means; and a fly wheel attached to said shaft adjacent and outside of one of said arms.

10. In a vibratory electric motor, a frame having spaced arms, a shaft extending through, and mounted to rotate in, said arms, and having a crank, electromagnetic means connected to said frame, a connecting-rod connected to said crank and adapted to be oscillated by said electromagnetic means to convert the oscillatory motion of said connecting-rod into rotary motion of said shaft, automatic means located between said spaced arms for supplying electric current to said electromagnetic means, and a fly-wheel attached to said shaft adjacent and outside of one of said arms.

WILLIAM C. UDE.